United States Patent [19]
Goto

[11] Patent Number: 5,951,645
[45] Date of Patent: *Sep. 14, 1999

[54] NETWORK PROTOCOL FOR TRANSFERRING DATA BETWEEN APPLICATIONS RUNNING ON DIFFERENT CLIENTS IN A CLIENT-SERVER SYSTEM

[75] Inventor: Hiroshi Goto, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/719,887

[22] Filed: Sep. 25, 1996

[51] Int. Cl.$^6$ ............................. G06F 13/00; G06F 13/38; G06F 15/17
[52] U.S. Cl. ............................................ 709/230; 370/469
[58] Field of Search ............................ 395/200.6, 200.61, 395/200.66, 200.67, 200.76, 200.79, 182.14, 182.16, 183.19, 185.09, 849, 850; 370/467, 469, 474, 476, 466; 709/230, 231, 236, 237, 246, 249; 714/43, 18, 56

[56] References Cited

U.S. PATENT DOCUMENTS

| | | | |
|---|---|---|---|
| 4,677,611 | 6/1987 | Yanosy, Jr. et al. | 370/85 |
| 5,416,905 | 5/1995 | Mori et al. | 395/200 |
| 5,485,460 | 1/1996 | Schrier et al. | 370/94.1 |
| 5,619,650 | 4/1997 | Bach et al. | 395/200.1 |
| 5,659,794 | 8/1997 | Caldarale et al. | 395/821 |
| 5,696,899 | 12/1997 | Kalwitz | 395/200.1 |
| 5,790,809 | 8/1998 | Holmes | 395/200.58 |

FOREIGN PATENT DOCUMENTS

| | | |
|---|---|---|
| 61-196645 | 8/1986 | Japan . |
| 2-79645 | 3/1990 | Japan . |
| 3-91049 | 4/1991 | Japan . |
| 3-162154 | 7/1991 | Japan . |
| 6-252977 | 9/1994 | Japan . |

OTHER PUBLICATIONS

Article "OSI–Computer Networks for Tomorrow", Edition 1, Japanese Standards Assn., Feb. 27, 1987, pp. 34–50.
"Network Introduction", UNIX Network Programming, (1995) pp. 203–216.

*Primary Examiner*—Mark H. Rinehart
*Assistant Examiner*—Marc D. Thompson
*Attorney, Agent, or Firm*—Foley & Lardner

[57] ABSTRACT

A communication system performs communication between a plurality of nodes connected to each other through a network. Each node includes a plurality of processing sections and a communication control section. Each of the processing sections executes an application program by using received application data, and generates user data. The communication control section performs network protocol processing for network connection between the nodes, and performs communication between the processing sections of the home node. The communication control section adds control information to the user data from the processing section of the home node, converts the user data into data suitable for the network protocol to send the data to the network. The communication control section also extracts the user data from the data received through the network according to the network protocol to output the user data to a corresponding one of the processing section of the home node.

18 Claims, 4 Drawing Sheets

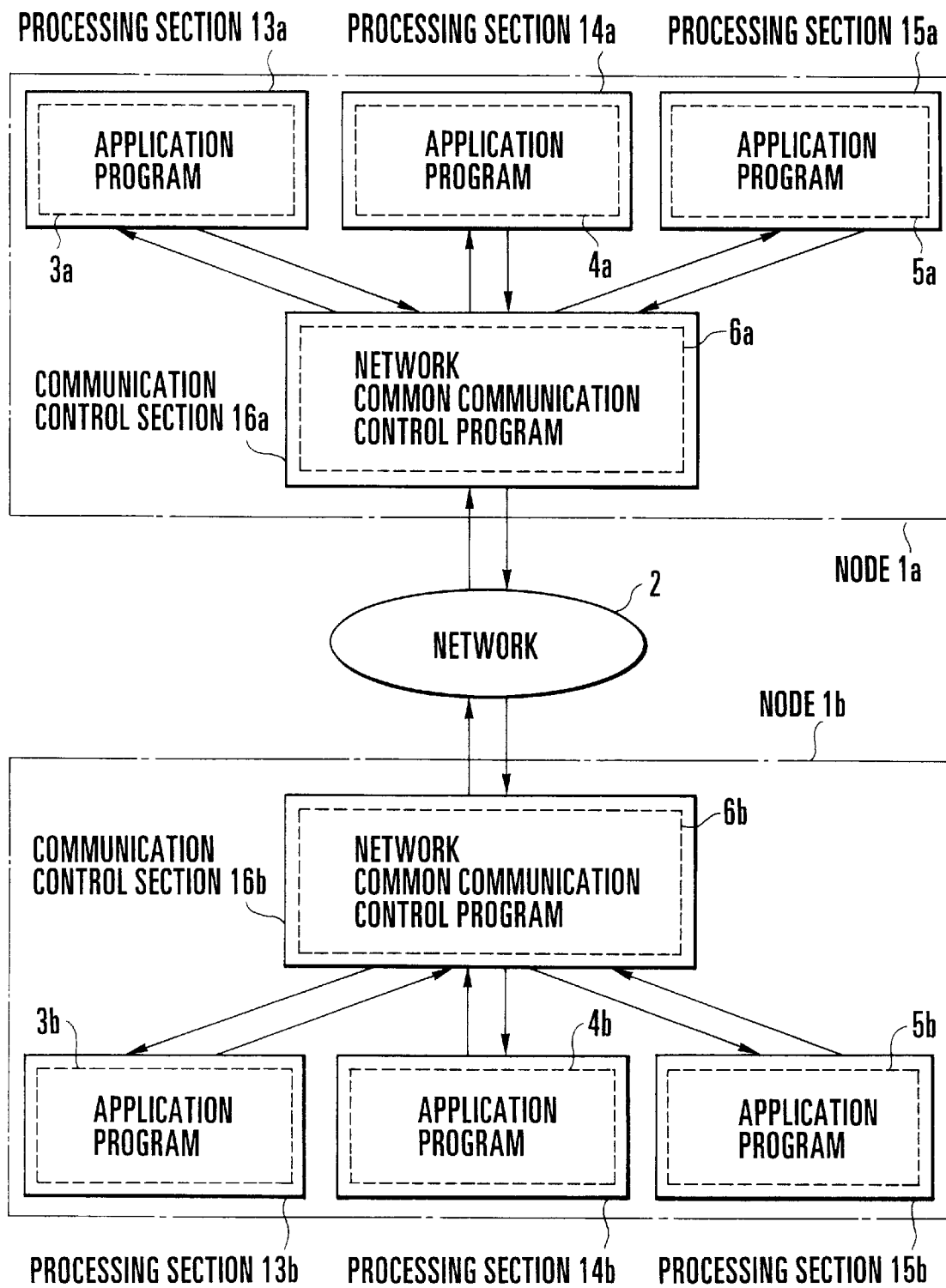
F I G. 1

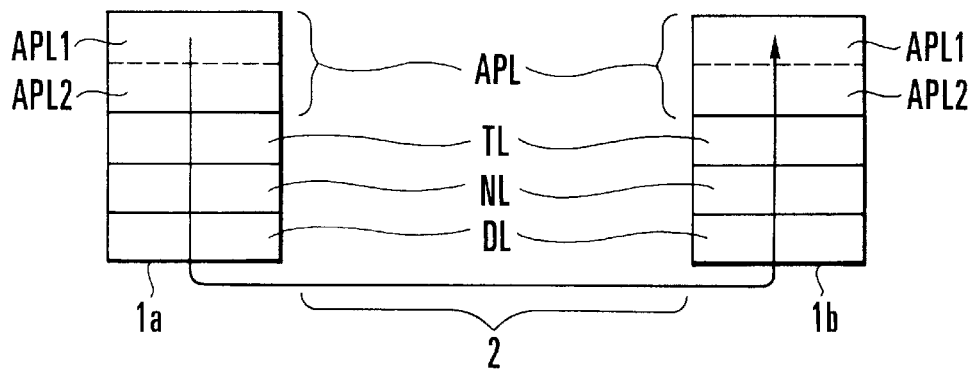
F I G. 2
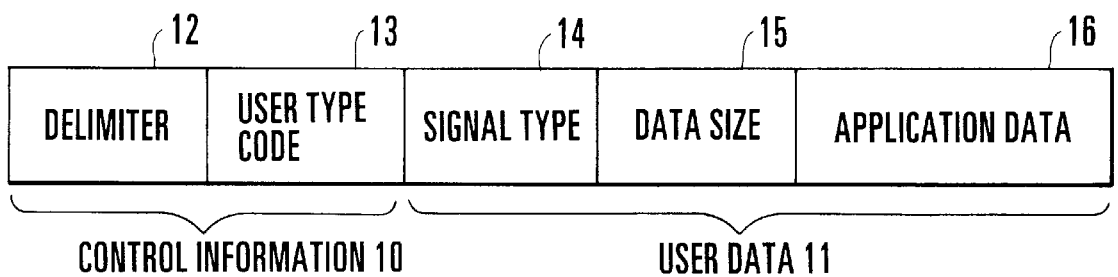
F I G. 3

NETWORK PROTOCOL FOR TRANSFERRING DATA BETWEEN APPLICATIONS RUNNING ON DIFFERENT CLIENTS IN A CLIENT-SERVER SYSTEM

BACKGROUND OF THE INVENTION

The present invention relates to a communication system for performing communication between a plurality of nodes connected to each other through a common network, a packet network, or a UNIX network.

Conventionally, in performing communication with a distant node through a UNIX network, each user realizes the communication interface with a desired distant user on a distant node on the basis of a protocol such as a transmission control protocol (to be referred to as a TCP hereinafter) or an internet protocol (to be referred to as an IP hereinafter).

Owing to the introduction of UNIX into the switching techniques, a UNIX network can be used for each application program at present. Each application program is now used for the interface with a distant node, which is performed on the basis of each application node for realizing each maintenance/operation service such as charging processing, subscriber data management, or failure notification with respect to the distant node.

When such an application program is to be installed in a communication system using a different network such as a common network or a packet network, the number of steps required to correct the program is preferably minimized.

When each application program realizes the interface with a UNIX network individually, each application program contains a program associated with a network protocol. For this reason, when an application program is to be installed in a different communication system, the program associated with the protocol must be corrected in accordance with the network.

In the above conventional communication system, when application programs are to be installed in a communication system using a different network, each application program requires the steps of correcting the program associated with network protocol. In addition, only a person who has knowledge about the protocol of the network can correct a program.

SUMMARY OF THE INVENTION

It is an object of the present invention to provide a communication system which realizes a hidden network protocol for each application program and allows each application program to be easily installed.

In order to achieve the above object, according to the present invention, there is provided a communication system for performing communication between a plurality of nodes connected to each other through a network, each of the nodes including a plurality of processing means each for executing an application program by using received application data, and generating user data, and communication control means for performing network protocol processing for network connection between the nodes, and performing communication between the processing means of a home node, wherein the communication control means adds control information to the user data from the processing means of the home node, converts the user data into data suitable for the network protocol to send the data to the network, and extracts the user data from the data received through the network according to the network protocol to output the user data to a corresponding one of the processing means of the home node.

BRIEF DESCRIPTION OF THE DRAWINGS

FIG. 1 is a block diagram showing a communication system according to an embodiment of the present invention;

FIG. 2 is a view showing protocol processing in the communication system in FIG. 1;

FIG. 3 is a view showing the format of an internal signal used for a network common communication control program in FIG. 1;

DESCRIPTION OF THE PREFERRED EMBODIMENT

Figure 4:
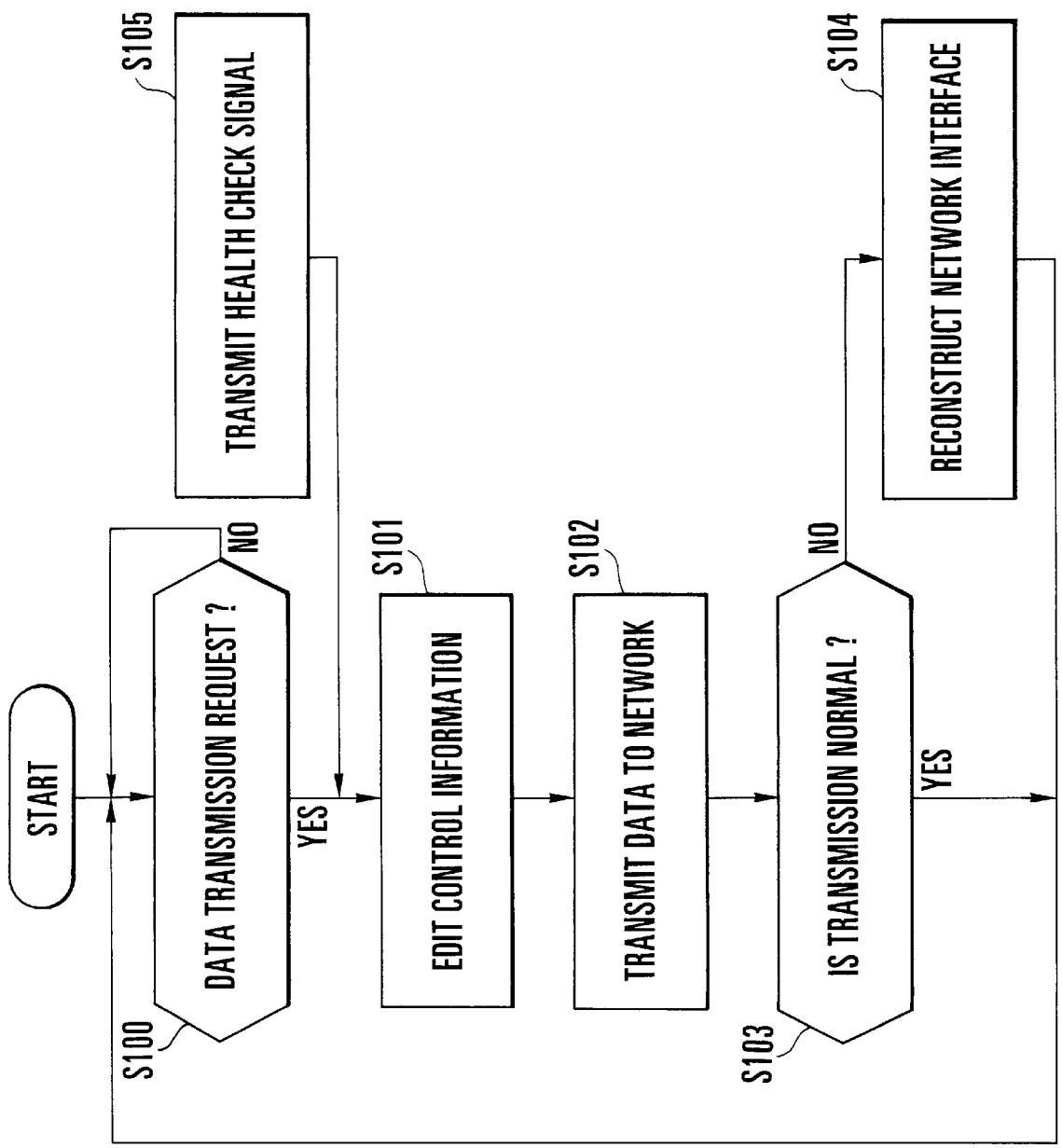
FIG. 4 is a flow chart for explaining the operation of a communication control section on the transmission side.

FIG. 1 shows a communication system according to an embodiment of the present invention. FIG. 2 shows protocol processing in this communication system.

Referring to FIG. 1, reference numerals 1a and 1b denote nodes which are, for example, computers; and 2, a network such as a common network, a packet network, or a UNIX network, which connects the nodes 1a and 1b to each other. The node 1a is constituted by processing sections 13a, 14a, and 15a and a communication control section 16a. The node 1b is constituted by processing sections 13b, 14b, and 15b and a communication control section 16b. The processing sections 13a, 13b, 14a, 14b, 15a, and 15b execute various application programs 3a, 3b, 4a, 4b, 5a, and 5b associated with maintenance/operation and used to realize various functions such as charging processing, subscriber data management, and failure notification with respect to a distant node. The communication control sections 16a and 16b perform network protocol processing for network connection between the nodes 1a and 1b according to network common communication control programs 6a and 6b. Each communication control section also performs communication between the processing sections of the home node. A set of the application programs 3a, 4a, and 5a, and the network common communication control program 6a, and a set of the application programs 3b, 4b, and 5b and the network common communication control program 6b are respectively stored in memories (not shown).

Referring to FIG. 2, reference symbol APL denotes an application layer for functions associated with various maintenance/operation services; APL1, an application layer for realizing the functions of the application programs 3a, 3b, 4a, 4b, 5a, and 5b; and APL2, an application layer in which a function of adding control information (to be described later) to user data transferred from the application layer APL1, a function of extracting user data from data sent from a transport layer (to be described later) and transferring the user data to the application layer APL1, and the like are defined.

Reference symbol TL denotes a transport layer serving to realize reliable communication between the nodes 1a and 1b according to the TCP; NL, a network layer for realizing network connection between the nodes 1a and 1b according to the IP; and DL, a data link layer for establishing a physical communication line. A physical layer for a definition about a physical medium is present as a lower layer of the data link layer DL. However, this layer is omitted from this embodiment.

The network common communication control programs 6a and 6b serve to perform protocol processing associated with layers, from the application layer APL2 to the data link layer DL, and the application programs 3a, 3b, 4a, 4b, 5a, and 5b perform only processing associated with the application layer APL1.

The operation of this communication system will be described next. FIG. 3 shows the format of an internal signal used in the communication control sections 16a and 16b. Reference numeral 10 denotes control information generated and analyzed by the communication control sections 16a and 16b in accordance with the network common communication control programs 6a and 6b using the function of the application layer APL2; and 11, user data generated and analyzed by the processing sections 13a, 13b, 14a, 14b, 15a, and 15b according to the application programs 3a, 3b, 4a, 4b, 5a, and 5b.

For example, the control information 10 is constituted by a delimiter 12 having a 2-byte fixed pattern "FEFE" and used to guarantee the validity of data, and a user type code 13 for identifying the application program 3a, 3b, 4a, 4b, 5a, or 5b for charging processing associated with charging for a call, subscriber data management, failure notification, or the like. The user data 11 used in each processing section 13a, 13b, 14a, 14b, 15a, or 15b is constituted by a signal type 14 for identifying the purpose (application) of data transmission, a data size 15 indicating the size of generated application data, and application data 16.

As described above, the network common communication control programs 6a and 6b serve for protocol processing associated with layers below the application layer APL2, and hence do not recognize the contents of the user data 11. In this embodiment, the structure of the user data 11 is defined as shown in FIG. 3. However, since this structure is given by a format determined between the user on the home node and the user on the distant node (application program), the structure shown in FIG. 3 need not always be used.

An operation to be performed when data is transmitted from the node 1a to the node 1b, will be described as an operation of this communication system with reference to the flow charts of FIGS. 4 and 5. When data is to be transmitted from the processing section 13a, the processing section 13a adds address information corresponding to the user type code 13 to the generated user data 11, and sends the resultant data to the communication control section 16a. Upon reception of the data from the processing section 13a, the communication control section 16a sends the received data to the network 2 in accordance with the network common communication control program 6a.

FIG. 4 shows the operation of the communication control section 16a. Referring to FIG. 4, the communication control section 16a always waits for a data transmission request from one of the processing sections 13a to 15a (step S100). When the communication control section 16a receives data from one of the processing sections 13a to 15a, and recognizes a data transmission request, the communication control section 16a adds the control information 10 constituted by the delimiter 12 and the user type code 13 to the head of the received user data 11 to generate data having the format shown in FIG. 3 (step S101).

The communication control section 16a performs protocol processing associated with the transport layer TL, the network layer NL, and the data link layer DL to convert this data into a data form that can be transmitted through the network 2, and sends it to the network 2 (step S102). That is, the communication control section 16a adds a TCP header to the data of this format as TCP data, and also adds an IP header to the head of the data constituted by the TCP header and the TCP data as IP data.

Subsequently, the communication control section 16a performs protocol processing associated with the data link layer DL to add a destination or source address and the like to the data constituted by the IP header and the IP data, and sends the resultant data to the network 2. In this case, the form of data changes depending on the type of the network 2.

Information of the distant node corresponding to the user type code 13 is registered in the network common communication control program 6a. The communication control section 16a generates the TCP header, the above IP header, the above destination address, the above source address, and the like on the basis of information of such a correspondence and the home node 1a.

In this manner, the communication control section 16a performs network protocol processing (TL, NL, and DL) for connection to the corresponding node in accordance with the data transmission request from the processing section 13a according to the application program 3a, thereby transmitting the data to the distant node 1b.

Upon detection of an abnormality in this data transmission process (step S103), the communication control section 16a immediately reconstructs a network interface corresponding to the corresponding node (step S104). In addition, the communication control section 16a sends a signal (health check signal) for checking the validity of the network 2 at predetermined intervals while waiting for a data transmission request from the processing sections 13a to 15a based on the application programs 3a to 5a (step S105).

Upon reception of the data through the network 2, the communication control section 16b of the node 1b transfers the user data 11 to the processing sections 13b, 14b, and 15b according to the network common communication control program 6b.

Figure 5:
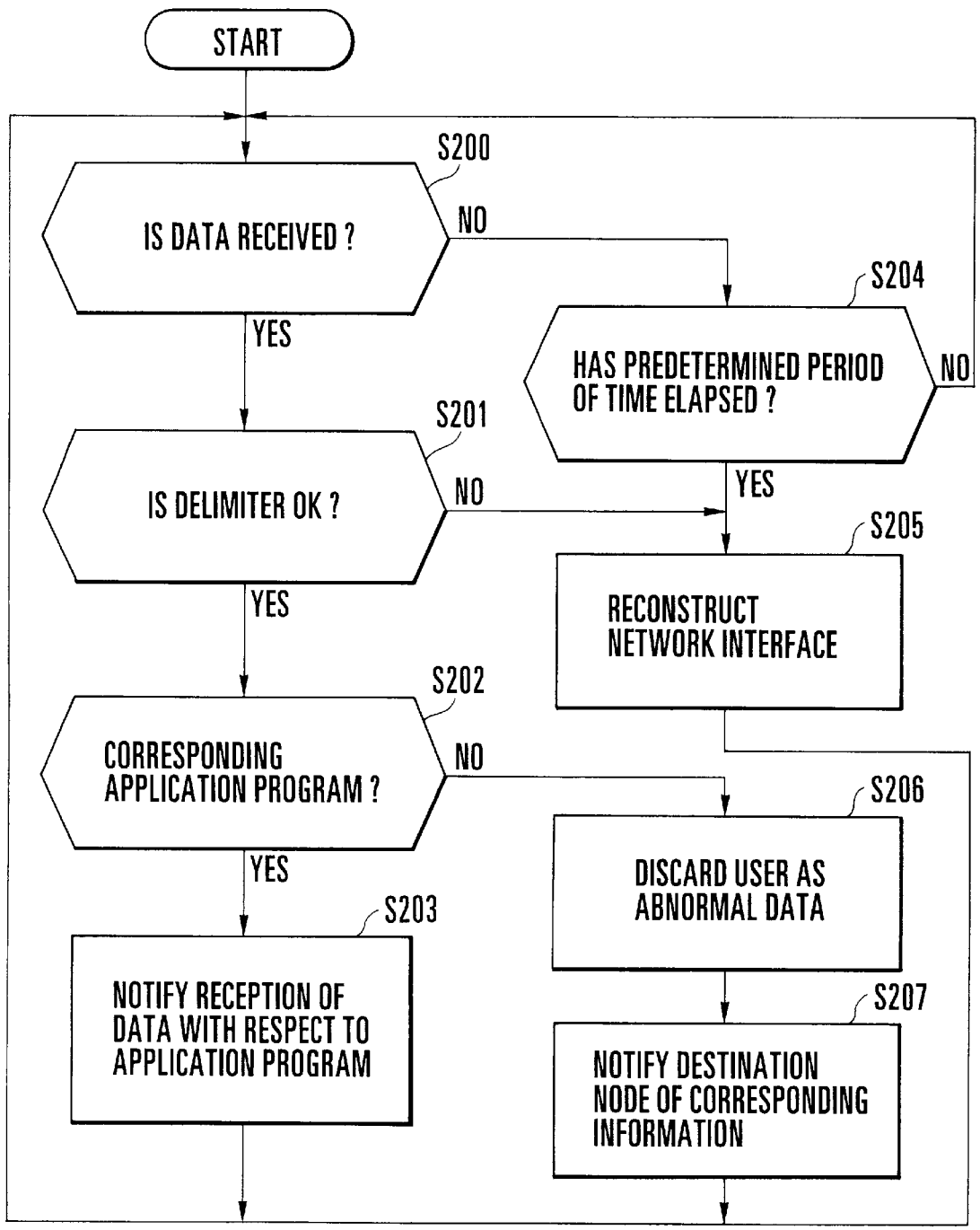
FIG. 5 is a flow chart for explaining the operation of a communication control section on the reception side.

FIG. 5 explains the operation of the communication control section 16b.

The communication control section 16b always waits for data from the network 2, e.g., packets if the network 2 is a packet network (step S200). Upon reception of data from the network 2, the communication control section 16b performs protocol processing associated with the data link layer DL, the network layer NL, and the transport layer TL to extract portions corresponding to TCP data, i.e., the control information 10 and the user data 11, from the received data.

Subsequently, the communication control section 16b checks on the basis of the delimiter 12 of the control information 10 whether the received data is valid (step S201). If YES in step S201, the communication control section 16b analyzes the user type code 13 to check whether there is a corresponding one of the application programs 3b, 4b, and 5b (step S202). If YES in step S202, the communication control section 16b transfers the user data 11, together with the source node information, to a corresponding one of the processing sections 13b, 14b, and 15b (step S203). Upon reception of the user data 11, the processing section 13b, 14b, or 15b an analyzes the user data 11 to perform predetermined processing based on one of the application programs 3b, 4b, and 5b.

For example, upon reception of data containing the user type code 13 indicating charging processing, the communication control section 16b transfers the user data 11 to the processing section 13b for executing the application program for charging processing. The processing section 13b analyzes the signal type 14 of the received user data 11 and recognizes that charging data is transmitted as the application data 16. The processing section 13b then generates a bill on the basis of this charging data.

The application data 16b receives a health check signal transmitted from the communication control section 16a of the node 1a. The communication control section 16b therefore receives some signal at predetermined intervals. If no signal is received within a predetermined period of time (step S204), or the delimiter 12 of a predetermined pattern cannot be checked in step S201, the communication control section 16b determines a network failure, and reconstructs the network interface with the node 1a (step S205).

If it is determined in step S202 that no corresponding application program is present, the communication control section 16b determines that the abnormal user type code 13 has been received (step S206), and notifies the communication control section 16a of the reception of the abnormal user type code 13 (step S207).

In this manner, the communication control section 16b selects one of the application programs 3b, 4b, and 5b which is to be performed on the basis of the user type code 13 contained in the received data according to the network common communication control program 6b, and transfers the user data 11 to a corresponding one of the processing sections 13b, 14b, and 15b.

In this embodiment, data is transmitted from the node 1a to the node 1b. However, the above description applies to a case wherein data is transmitted from the node 1b to the node 1a.

As described above, since the application programs 3a to 5a and 3b to 5b do not handle any portion associated with a network protocol (a TCP header in the transport layer TL, an IP header in the network layer NL, destination and source addresses in the data link layer DL, and the like), the network protocol need not be recognized. In this manner, a hidden network protocol can be realized by the network common communication control programs 6a and 6b with respect to each application program.

With this operation, in installing an application program in a communication system using a different network, only a network common communication control program for the network is required, but any portion associated with the network protocol need not be corrected for each application program. The number of steps required for correction can therefore be minimized.

In this embodiment, communication is performed between the two nodes. As is apparent, however, communication may be performed between a plurality of nodes.

For the sake of descriptive convenience, the processing sections 13a, 14a, and 15a and the communication control section 16a are arranged in correspondence with the application programs 3a, 4a, and 5a and the network common communication control program 6a. As is apparent, however, the processing sections 13a, 14a, and 15a and the communication control section 16a may be integrated into one processing section for executing a plurality of programs. Similarly, the processing sections 13b, 14b, and 15b and the communication control section 16b may be integrated into one processing section.

According to the present invention, a communication control means on the transmission side converts user data into data suitable for a network protocol, and a communication control means on the reception side extracts the user data from the received data and transfers the user data to a processing section. For this reason, each processing section need not recognize the network protocol. Therefore, a common application program can be used by communication systems using different networks, and the number of developing steps can be greatly decreased. In addition, when an application program is to be installed in a communication system using a different network, any portion associated with the network protocol need not be corrected. For this reason, even a person who does not have knowledge about the network protocol can easily generate a program.

In addition, the communication control means on the transmission side adds a user type to user data, and the communication control means on the reception side transfers the user data to a processing section corresponding to the user type, thereby easily realizing communication between the processing sections of each node.

Furthermore, the communication control means on the transmission side adds a delimiter to user data, and the communication control means on the reception side checks on the basis of the delimiter whether the user data is valid. With this operation, the validity of data can be checked at a level higher than the network protocol, thus obtaining higher reliability.

What is claimed is:

1. A communication system for performing communication between a plurality of nodes connected to each other through a network,
    each of said nodes including
        a plurality of processing means each for executing an application program by using received application data, and generating user data according to a first application layer protocol; and
        communication control means for performing network protocol processing for network connection between said nodes, and performing communication between said processing means of a home node according to a second application layer protocol,
    wherein said communication control means adds control information to the user data received from said processing means of said home node according to said second application layer protocol, converts the user data into data suitable for the network protocol to send the data to the network, and extracts the user data from the data received through the network according to the network protocol to output the user data to a corresponding one of said processing means of said home node.

2. A system according to claim 1, wherein said communication control means performs protocol processing which handles user type information serving as a layer higher than the network protocol and used to identify a type of an application program, and said communication control means adds user type information as control information to user data from said processing means and converts the data into data suitable for the network protocol in a transmission process, and extracts user type information from received data and outputs the user data to said processing unit corresponding to the extracted user type information in accordance with the network protocol.

3. A system according to claim 1, wherein said communication control means performs protocol processing which handles a delimiter serving as a layer higher than the network protocol and having a fixed pattern for guaranteeing validity of data, and said communication control means adds a delimiter as control information to user data from said processing means and converts the data into data suitable for the network protocol in a transmission process, and extracts a delimiter from received data and checks validity of the user data on the basis of the extracted delimiter in a reception process in accordance with the network protocol.

4. A system according to claim 3, wherein said communication control means reconstructs a network interface when the user data is not valid, and no data is received for not less than a predetermined period of time.

5. A system according to claim 1, wherein when said processing means of said home node does not correspond to the extracted user data, said communication control means discards the user data as abnormal data, and notifies a destination node of corresponding information.

6. A system according to claim 1, wherein the user data generated by said processing means is constituted by user data including a signal type, a data size, and application data.

7. A system according to claim 1, wherein said respective processing means and said communication control means are constituted by a signal processor.

8. A system according to claim 1, wherein the second application layer protocol adds control information to the user data transferred according to the first application layer protocol.

9. A system according to claim 8, wherein the second application layer protocol is at a hierarchy level between the first application layer protocol and a transport layer protocol.

10. A communication system for performing communication between a plurality of nodes connected to each other through a network,
   each of said nodes including
      a plurality of processors each for executing an application program by using received application data, and generating user data according to a first application layer protocol; and
      a communication controller communicatively connected to the plurality of processors and configured to perform network protocol processing for network connection between said nodes, and configured to perform communication between said processors of a home node according to a second application layer protocol,
   herein said communication controller adds control information to the user data received from at least one of said plurality of processors of said home node according to the second application layer protocol, converts the user data into data suitable for the network layer protocol to send the data to the network, and extracts the user data from the data received through the network according to the network protocol to output the user data to a corresponding one of said plurality of processors of said home node.

11. A system according to claim 1, wherein the network protocol processing includes at least transport layer protocol processing and data link layer protocol processing.

12. A system according to claim 1, wherein said communication control means adds the control information to the user data according to only said second application layer protocol.

13. A system according to claim 1, wherein the control information extracted from the user data by said communication control means is used to determine if the user data is correct and to determine which of said plurality of processing means of said home node is to be sent the user data.

14. A system according to claim 10, wherein the network protocol processing includes at least transport layer protocol processing and data link layer protocol processing.

15. A system according to claim 10, wherein said communication controller adds the control information to the user data according to only said second application layer protocol.

16. A system according to claim 10, wherein the control information extracted from the user data by said communication controller is used to determine if the user data is correct and to determine which of said plurality of processors of said home node is to be sent the user data.

17. A system according to claim 1, wherein said communication control means outputs a health check signal at predetermined intervals to said network to check whether said network is operating correctly or not, and
   wherein if said health check signal is not received within a predetermined time after a most recent health check signal was output, said communication control means reconstructs a network interface of said home node to said network.

18. A system according to claim 10, wherein said communication controller is configured to output a health check signal at predetermined intervals to said network to check whether said network is operating correctly or not, and
   wherein if said health check signal is not received within a predetermined time after a most recent health check signal was output, said communication controller reconstructs a network interface of said home node to said network.

* * * * *